US009042904B2

(12) United States Patent
Xie et al.

(10) Patent No.: US 9,042,904 B2
(45) **Date of Patent: *May 26, 2015**

(54) LOCALIZED DYNAMIC CHANNEL TIME ALLOCATION

(71) Applicant: Broadcom Corporation, Irvine, CA (US)

(72) Inventors: Hongyu Xie, San Diego, CA (US); Srikanth Shubhakoti, Milpitas, CA (US); Matthew James Fischer, Mountain View, CA (US); Shawn Shiliang Ding, San Diego, CA (US); Gang Lu, Pleasanton, CA (US); Yuan Zhuang, San Diego, CA (US); Brima Ibrahim, Laguna Hills, CA (US); Payam Torab Jahromi, Laguna Niguel, CA (US); Murat Mese, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,970

(22) Filed: Apr. 1, 2014

(65) Prior Publication Data

US 2014/0213273 A1 Jul. 31, 2014

Related U.S. Application Data

(63) Continuation of application No. 13/287,936, filed on Nov. 2, 2011, now Pat. No. 8,731,572.

(51) Int. Cl.
*H04W 72/00* (2009.01)
*H04W 72/04* (2009.01)
*H04L 5/00* (2006.01)
*H04W 72/12* (2009.01)

(52) U.S. Cl.
CPC ......... *H04W 72/0446* (2013.01); *H04L 5/0092* (2013.01); *H04W 72/1268* (2013.01); *H04W 72/1289* (2013.01)

(58) Field of Classification Search
USPC ........... 455/422.1, 450–453, 456.2, 464, 509, 455/510; 370/395.41, 332; 375/E7.141
See application file for complete search history.

(56) References Cited

U.S. PATENT DOCUMENTS

| | | | | |
|---|---|---|---|---|
| 8,214,712 | B2 * | 7/2012 | Wang | 714/748 |
| 8,526,460 | B2 * | 9/2013 | Booton | 370/442 |
| 8,767,640 | B2 * | 7/2014 | Lakkis | 370/329 |

OTHER PUBLICATIONS

R. Braden, et al., Resource ReSerVation Protocol (RSVP), Version 1 Functional Specification, Network Working Group, Category: Standards Track, Sep. 1997, 113 pages.

(Continued)

*Primary Examiner* — Dominic E Rego
(74) *Attorney, Agent, or Firm* — Brinks Gilson & Lione

(57) ABSTRACT

Techniques for localized dynamic channel allocation help meet the challenges of latency, memory size, and channel time optimization for wireless communication systems. As examples, advanced communication standards, such as the WiGig standard, may support wireless docking station capability and wireless streaming of high definition video content between transmitting and receiving stations, or engage in other very high throughput tasks. The techniques help to deliver the desired user experience in such an environment and support desired performance levels for latency and throughput while controlling memory footprint.

20 Claims, 7 Drawing Sheets

(56) References Cited

OTHER PUBLICATIONS

J. Wroclawski, Specification of the Controlled-Load Network Element Service, RFC 2211, Network Working Group, Category: Standards track, Sep. 1997, 20 pages.
S. Shenker, et al., Specification of Guaranteed Quality of Service, RFC 2213, Network Working Group, Category: Standards Track, Sep. 1997, 21 pages.
S. Shenker, et al., General Characterization Parameters for Integrated Service, RFC 2315, Network Elements, Network Working Group, Category: Standards Track, Sep. 1997, 17 pages.
IEEE Standard for Information Technology-Telecommunications and Information Exchange Between Systems-Local and Metropolitan Area Networks-Specific Requirements, Part 11: Wireless LAN Medium Access Control (MAC) and Physical Layer (PHY) Specifications; Amendment 5: Enhancements for Higher Throughput, IEEE Computer Society, IEEE Std. 802.11n, Oct. 29, 2009, 536 pages.
Wireless Gigabit Alliance, WiGig White Paper Defining the Future of Multi-Gigabit Wireless Communications, Jul. 2010, 5 pages.
WGA, Inc., Draft MAC and PHY Specification D1.1.1, WGA Specification, Apr. 11, 2011, 463 pages.
Integrated Services, Wikipedia, http://en/wikipedia.org/wiki/Integrated_service, downloaded Oct. 19, 2011, 3 pages.

* cited by examiner

100

LOCALIZED DYNAMIC CHANNEL TIME ALLOCATION

PRIORITY

This application is a continuation of and claims priority to U.S. application Ser. No. 13/287,936, filed Nov. 2, 2011, now U.S. Pat. No. 8,731,572.

TECHNICAL FIELD

This disclosure relates to communication protocols. In particular, this disclosure relates to latency, data memory size, and wireless channel time utilization optimization for wireless communication systems.

BACKGROUND

Continual development and rapid improvement in wireless communications technology have lead the way to increased data rates and broad wireless functionality in many different environments, including the home and business environments. These developments and improvements have been driven in part by the widespread adoption of digital media, including high definition video and music. The most recent developments in wireless connectivity promise new functionality and data rates far exceeding rates that the 802.11n and the 802.11TGac standards provide. These recent developments include the Wireless Gigabit Alliance (WiGig) and 802.11TGad 60 GHz wireless specifications.

The 60 Ghz specifications provides data transmission rates of up to 7 Gbps in a single stream, which is more than 10 times faster than the highest data rate that the 802.11n multiple input multiple output (MIMO) standard supports. Another benefit of the 60 GHz specifications is that devices in the 60 GHz ecosystem will have the bandwidth to wirelessly communicate significant amounts of information without performance compromises, thereby eliminating the current need for tangles of cables to physically connect devices. WiGig compliant devices may, as examples, provide wireless docking station capability and wirelessly stream high definition video content directly from a Blu-Ray player to a TV with little or no compression required.

Multiple devices may be communicating such streams to multiple different receivers, and each device may compete for channel time to deliver the stream. To deliver the desired user experience in such an environment, there is a need to meet latency and throughput requirements while limiting memory footprint requirements.

BRIEF DESCRIPTION OF THE DRAWINGS

The system may be better understood with reference to the following drawings and description. In the figures, like reference numerals designate corresponding parts throughout the different views.

DETAILED DESCRIPTION

This description relates to wireless communication under standards such as the IEEE 802.11 standards or the WiGig standards, including the 60 GHz wireless specification promoted by the Wireless Gigabit Alliance and the IEEE 802.11TGad standard. Accordingly, the discussion below makes reference to Service Periods (SPs), such as those defined by the WiGig standard. During the SPs, a source station will communicate, potentially, with multiple destination stations. The techniques described are not limited to WiGig SPs, however, and instead are applicable to any wireless communication protocol that provides for allocations of channel capacity to stations. Different from counterparts operating in lower frequency bands, wireless modems operating in 60 GHz frequency band often rely on high antenna gain, achieved through mechanisms such as beam-forming using directional antennas, to compensate the link margin loss in 60 GHz band. The techniques described here may be employed even when directional antennas are not used, but in wireless systems with directional antennas the techniques are often particularly beneficial.

The stations may take many different forms. As examples, the stations may be cell phones, smart phones, laptop computers, personal data assistants, pocket computers, tablet computers, portable email devices, people or pets, or processes or threads executed in memory by a processor. Additional examples of stations include televisions, stereo equipment such as amplifiers, pre-amplifiers, and tuners, home media devices such as compact disc (CD)/digital versatile disc (DVD) players, portable MP3 players, high definition (e.g., Blu-Ray™ or DVD audio) media players, or home media servers. Other examples of stations include musical instruments, microphones, climate control systems, intrusion alarms, audio/video surveillance or security equipment, video games, network attached storage, network routers and gateways, pet tracking collars, or other devices.

Stations may be found in virtually any context, including the home, business, public spaces, or automobile. Thus, as additional examples, stations may further include automobile audio head ends or DVD players, satellite music transceivers, noise cancellation systems, voice recognition systems, climate control systems, navigation systems, alarm systems, engine computer systems, or other devices.

Figure 1:
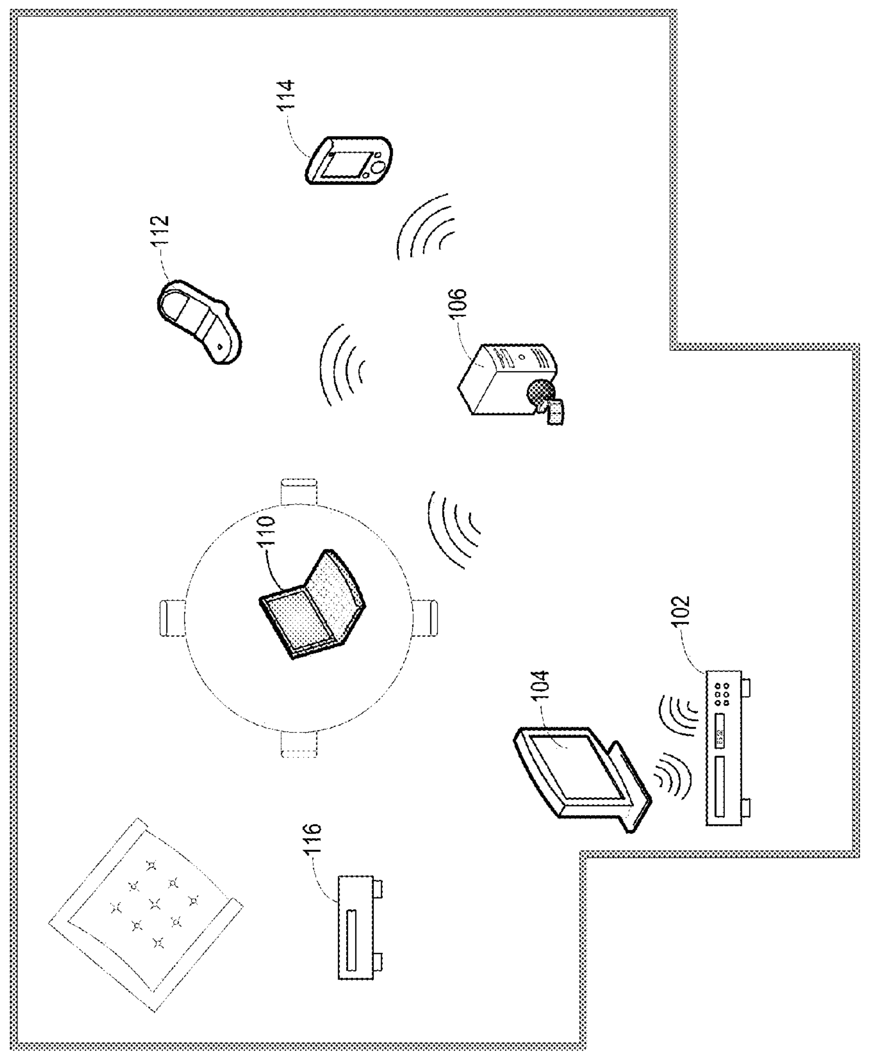
FIG. 1 shows an environment in which wireless stations communicate with one another.

FIG. 1 shows one example of an environment 100 in which stations communicate with one another. In this example, the environment 100 is a room in a home. For example, the environment 100 includes a media player 102 (e.g., a Blu-Ray™ player) that streams high definition video and audio content to a high definition liquid crystal display (LCD) television (TV) 104. Similarly, a home media server 106 with a wireless network interface streams audio (e.g., MP3 content) and video (e.g., MP4, AVI, or MPEG content) to multiple destination stations in the environment 100, including the laptop 110, the smartphone 112, and the portable gaming system 114. A network scheduler 116 provides network management functionality in support of whichever standard is in use in the environment 100, such as by scheduling SPs for the stations under the WiGig standard. Typically, one of the stations in the wireless network assumes the role of network scheduler.

A station in the network communicates its Quality of Service (QoS) requirements to the network scheduler 116 by sending, as one example, a service request containing a Traffic Specification element (TSPEC) to the scheduler 116. The TSPEC may take the form of a set of numeric parameters, or may take other forms in other implementations. Depending on the wireless channel time availability, the network scheduler 116 may reject or accept the received TSPEC. Once a TSPEC from a station is accepted, the network scheduler 116 will be responsible for scheduling enough wireless channel time, for example in the form of SP(s), to meet the QoS requirements specified in the accepted TSPEC. The network scheduler 116 communicates the scheduled channel time allocation information, such as SPs, to all stations currently associated with the network ahead of time. Normally, a SP is associated with a source station, one or more destination station(s), and is characterized by a starting time and duration. The SP allocations involving multiple destination stations may be created by the network scheduler 116 through combining multiple TSPEC requests issued by the future source station and/or the future destination station(s). One reason for doing so is to leave sufficient fine-grained scheduling flexibility to the future source station so that it can adjust the sequence and duration of communicating each of the destination stations based on the dynamic needs. During a SP, the SP owner or the source station is entitled to a specific window of time (as specified by the SP duration) to transmit information without other stations attempting to access the channel. Since the SP allocation information is communicated to all stations before the SP starts, each station (including the destination stations that the source station will communicate with) knows ahead of time about the SPs that are scheduled. Therefore, if a destination station knows when to listen for communications from the SP, and, if the destination station uses a directional antenna during the SP, the destination station can tune its receive antenna to the source station at SP's start time.

As noted above, a requesting station may specify the source station for any requested SP allocation using a source station identifier (e.g., a unicast source address), and may specify one or more destination stations. A multiple destination station identifier in the request may specify the multiple destination stations. The multiple destination station identifier may be, as examples, a broadcast identifier or multicast identifier (e.g., an identifier established for a predefined group of stations among all of the stations in the network). In other implementations, the requesting station may specify multiple destination stations with individual identifiers for the destination stations.

Ordinarily, a source station that specifies a multiple destination station identifier is expected to transmit the same data stream to each of the multiple destination stations. As an example, by specifying a multicast identifier, the source station is expected to communicate the same data stream to each of the multiple destination stations included in the multicast identifier (e.g., by performing a multicast transmission of the data stream during the SP). However, the source end point may instead, during its SP, communicate individually with chosen destination stations, and may therefore communicate different data streams to each of the destination stations.

Furthermore, the stations may implement a Reverse Direction (RD) protocol that permits the source station to act as a RD initiator that offers a destination station to act as a RD responder. As an RD responder, the destination station has the opportunity to transmit data back to the RD initiator during the RD initiator's SP. The reverse direction channel may provide a source of allocation adjustment information external to the source station for (as described in detail below) for dynamically adjusting transmit channel allocations within the current or subsequent SP(s) for communicating to specific destination stations. The RD protocol may be the RD protocol defined in the IEEE 802.11 standards or the WiGig standards.

Figure 2:
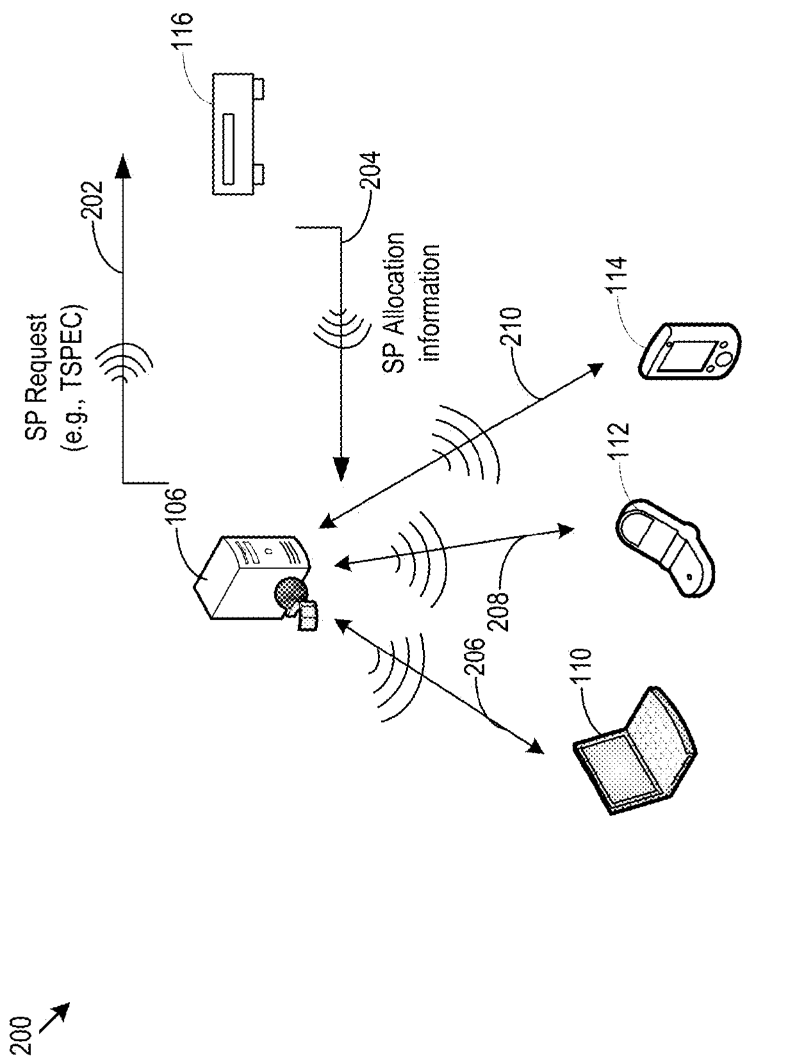
FIG. 2 shows a network manager communicating service period allocation(s) to a source station requesting channel time by sending a Traffic Specification element (TSPEC).

FIG. 2 shows the home media server 106 streaming high definition audio/visual content 202 to multiple destination stations in the environment 100, including the laptop 110, the smartphone 112, and the portable gaming system 114.

However, instead of broadcasting or multicasting the same data stream to the destination stations 110, 112, 114, the home media server 106 may individually communicate separate data streams 206, 208, 210 to the destination stations during its SP. In doing so, the home media server 106 may execute its own scheduler logic to choose the destination stations it will communicate with, determine transmit channel allocations for each destination station, and individually transmit any desired data stream to each chosen destination station during the transmit channel allocation determined for that destination station.

Figure 3:
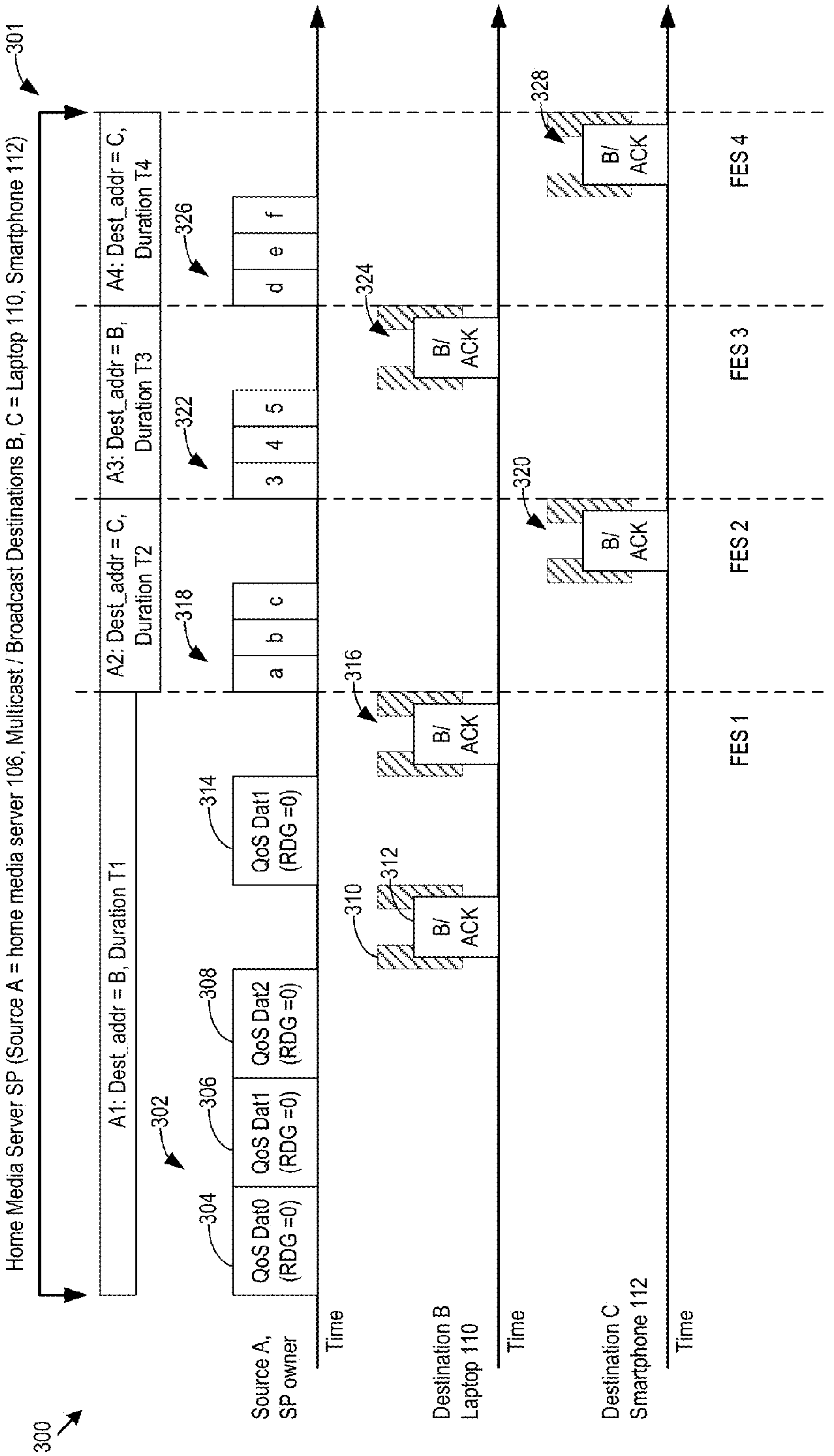
FIG. 3 shows a communication diagram for a source station communicating with multiple destination stations in a single service period.

FIG. 3 shows a communication diagram 300 illustrating an example of communication from the home media server 106 to the laptop 110 and the smartphone 112 during the SP 301 for the home media server 106. In this respect, the home media server 106 acts as a source station, and the laptop 110, smartphone act as destination stations. The home media server 106 may communicate with additional, fewer, or different destination stations during its SP, however, and any other station may act as a source station at some other point in time. Despite requesting a SP for multicast/broadcast, the home media server 106 individually communicates with the laptop 110 and the smartphone 112. In particular, the scheduler in the home media server 106 divides its SP 301 into smaller transmit channel allocations A1, A2, A3, and A4 for each destination station.

In the example shown in FIG. 3, the transmit channel allocations A1, A2, A3, A4 are allocations in time with durations of T1, T2, T3, and T4 respectively. Four allocations are shown. The source station may initiate a reverse direction grant during any transmit channel allocation, although the example shown in FIG. 3 indicates that the reverse direction grant (RDG) indicators are set to zero. During A1 and A3 the home media server 106 communicates with the laptop 110. During A2 and A4 the home media server 106 communicates with the smartphone 112.

Note that the home media server 106 could have specified a destination identifier in its SP request as either a broadcast identifier or multicast identifier, or other type of multiple destination identifier. If a destination identifier is a broadcast identifier, then all stations other than the source station are expected to listen for transmissions from the source station during its SP, and they are expected to steer their receive antenna towards the source station at the beginning of the SP. Therefore, to allow destination stations to enter power saving mode or to communicate to other destination stations during the SP (for networks with spatial sharing capability), the source station may instead specify in the SP request a multicast identifier which specifies a smaller intended subset of stations that the source station may communicate with. Hence only those stations belonging to the intended subset as specified by the multicast identifier need to stay awake and steer their antenna toward the source station as specified by the source identifier, while the rest of stations within the network may enter power saving mode or communicate to each other as desired.

During A1, the home media server 106 transmits an aggregation 302 of QoS Data frames 304, 306, and 308. The home media server 106 may organize and aggregate the QoS Data frames into media access control (MAC)-level protocol data units (MPDUs) carried by Physical (PHY) layer protocol data units (PPDUs), for example. In particular, during the SP, instead of using a broadcast/multicast address as target receiver's address, the SP owner and source station (the home media server 106) may use a unicast destination address to individually pick which destination station to send data to, and may steer its transmit antenna beam towards that chosen destination station. The home media server 106 also decides how long and how often it communicates to a particular destination station within the bounds of the SP duration, and in light of other possible constraints, such as QoS or throughput requirements for the various destination stations. This kind of traffic scheduling flexibility, optionally in connection with traffic control information, provides dynamic channel time allocation features into the otherwise normally static SP allocations. The dynamic channel allocations help achieve memory size, latency reduction and channel usage efficiency improvement goals.

Four frame exchange sequences (FES1, FES2, FES3, FES4) are shown in FIG. 3 during the transmit channel allocations A1, A2, A3, and A4. The first and third FES are between home media server 106 and the laptop 110, while the second and the fourth FES are from the home media server 106 to the smartphone 112. In the example in FIG. 3, the wireless channel between the home media server 106 and the laptop 110 is less reliable than that between the home media server 106 and the smartphone 112. In the first FES, the laptop 110, within the required interframe spacing 310, block acknowledges, with the B/ACK frame 312, successful receipt of the data frames 304 and 308, but indicates reception failure for data frame 306.

The home media server 106 retransmits the second data frame as the data frame 314. The laptop 110 sends an acknowledgement 316. The source station may dynamically adjust any transmit channel allocation for any particular destination station. For example, in the next FES with the laptop 110 during A3, FES 3, the home media server 106 may apply more robust encoding (or take other steps to enhance data integrity) to send the data frames 322 (acknowledged by B/ACK 324). The home media server 106 may either allocate a longer transmit channel allocation to send the same amount of data, or send less data in the same transmit channel allocation (as A1). It is also possible for the home media server 106 to reduce the transmit channel allocate and send even less data to the laptop 110.

In contrast, benefitting from a good channel to the smartphone 112, both FES 2, in which the home media server 106 communicates the data frames 318 and receives the ACK 320, and FES 4, in which the home media server 106 communicates the data frames 326 and receives the ACK 328, are successful without resorting to retransmission. Therefore, the home media server 106 may need more channel time to send the same amount of information to the laptop 110 than to the smartphone 112. In general, the home media server 106 may dynamically make transmit channel allocation adjustments based on a wide range of criteria, including allocation adjustment information local or external to the source station (e.g., the poor channel condition between the home media server 106 and the laptop 110).

Benefits in terms of latency, memory usage and channel time usage are achieved compared with static SP allocations between a unicast source and a unicast destination. When SP allocations with only a unicast destination are used, particular traffic from a unicast source to a unicast destination has to wait for the next SP designated to it to start flowing. Prior to that, the traffic must wait (therefore incurring latency) and accumulate all traffic data during the wait (therefore incurring higher memory usage). Note that, even though the network scheduler 116 schedules the allocations based on the TSPEC for any particular traffic, unless the traffic parameters (e.g., throughput) are static and the wireless channel condition is static (therefore with fixed packet error rate (PER)), it is difficult if not impossible for the network scheduler 116 to provide accurate allocations mainly for two reasons. First, the TSPEC for the traffic cannot fully capture the dynamic characteristics of the corresponding traffic, especially for variable bit rate (VBR) traffic such as AV streams handled by VBR CODECs. Second, the allocation information from the centralized network scheduler is communicated to all stations associated with the network ahead of time due to processing delay and communication delay. Therefore, those allocations cannot track or reflect the real channel condition the traffic experiences because the channel condition might very well change between the time the relevant SP allocations were generated by the network scheduler to the time the SP starts due to the dynamic nature of the wireless channel. By applying the localized dynamic allocation techniques described in this disclosure to the otherwise static allocations from the network scheduler 116, the techniques can effectively address both dynamic traffic and dynamic channel condition issues that may arise, by adjusting the sequence and/or duration of each traffic component within a SP. In addition to the latency and resulting memory usage benefits, there are benefits in channel time efficiency because any allocation time in the SP that turns out to be extra (e.g., an amount over budgeted in case of poor channel quality that does not actually manifest itself) can be allocated to sending data to other destination stations. Given a normal distribution of the amount of extra allocation actually required for any given traffic during any given SP, the average amount of extra allocation required for a dynamically adjusted SP is less than the sum of the extra allocations per individualized SPs. This is because the channels between different source and destination pairs are not independent of each other in practice.

As noted above, the source station may consider, as examples, allocation adjustment information local to (e.g., measured at the source station), external to (e.g., received from a destination station or other source), or both external to and local to the source station, for making local dynamic traffic channel allocation decisions. As one example, for audio-visual (AV) streaming applications, the AV source(s) usually dictates the rate at which the AV traffic(s) flow towards destination stations or other AV sink(s). The SP owner for the AV source(s) accepts and buffers the data coming from the AV source(s), and then schedules the data transmission to one or more destination stations for the AV sinks. Since the AV sink(s) are supposed to closely follow the AV source(s), the SP owner may allocate channel time to different AV traffics sharing the same SP according to the amount of buffered data for each active AV traffic with respect to their relative nominal throughput ratio.

As one example, assuming the nominal throughput of AV1 is two times that of AV2, the scheduler logic in the source station may start by allocating twice the amount of channel time to AV1 traffic compared to AV2 traffic. However, considering the allocation adjustment information, if the buffered data for AV1 is more than twice the buffered data for AV2 (e.g., due to a lower physical (PHY) layer data rate and/or more retransmissions, such that less than the expected amount of AV1 data gets through within the allocated channel time successfully), then the source station may dynamically allocate more channel time to AV1 to help the buffered data ratio for AV1 and AV2 move towards the nominal throughput ratio and reverse (or at least reduce or stop) the buffer consumption trend (which helps to limit the amount of memory required).

Similarly, if the buffered data for AV1 is less than twice of the buffered data for AV2, then the source station may allocate more channel time to AV2 to the same end. In this way, benefits to buffer size, latency and channel time usage may be achieved. In one implementation, the scheduler logic in the source station attempts, as its goal, to keep buffer consumption and latency in check, instead of making the buffered data amount ratio approach some nominal throughput ratio. However, the scheduler logic may use latter as a guideline to decide which direction to make an adjustment to the transmit channel allocations because the nominal throughput ratio might not always be accurate, especially in variable rate application scenarios.

The scheduler logic in the source station may increase a transmit channel allocation for a variety of reasons. In addition to increasing the transmit channel allocation when the channel condition is worse than expected (which results in lower PHY rate and/or more retransmissions), the source station may also increase the transmit channel allocation when the desired transmission rate is higher than expected, or for any other reason. The desired transmission rate may increase, for example, for AV streaming with variable rate encoding, because the actual rate can fluctuate above or below the nominal rate. Regardless of the reason, the dynamic allocation and adjustments described can react to the net effect that the actual data amount in the transmit buffer does not match the nominal throughput ratio. As a result, the source station may adjust the transmit channel time allocations. Continuing the previous example, suppose that the channel condition to AV1 and AV2 are both satisfactory, but the initial estimate of a 2-to-1 nominal throughput ratio is incorrect, and the actual ratio is 1-to-1. Then the net effect is that there would be continuous data accumulation in the AV2 traffic memory queue. As a result, the scheduler logic in the source station may adjust the transmit channel allocations so that the source station allocates more channel time to AV2 to reverse or stop the accumulation of data in the buffer. Thus, even in a complex traffic situation (e.g., including variable data rates), the dynamic allocation techniques can appropriately respond.

The traffic memory queue utilization is an example of information local to the source station. The source station may also consider external information in making transmit channel allocation adjustments. For example, AV streaming data delivery time requirement information may be sent to the source station, which may then use the information in the traffic control process. As another example, a destination station may communicate receive data buffer capacity or overflow back to the source station. In one implementation, a block acknowledgement with flow control may use the optional flow control field RxBufferCapacity to inform the source station of how much empty buffer space is left in the receiver. If the buffer space is overflowing, for example, the source station may reduce the transmit channel allocation to that destination station to reduce the data arrival rate at the destination station. If the buffer space is nearly empty, the source station may try to increase the transmit channel allocation to increase the data arrival rate at the destination station.

The source station may consider any allocation adjustment information received from any source. As another example, the source station may consider information received in an Action frame that contains, e.g., vendor specific steps for the recipient (e.g., the source station) to take, or noting how much buffer space remains at the receiver using an information element in the Action frame. As another example, the currently unused SequenceNumber field in a QoS Null frame may convey to the source station how much room is left in a receive buffer at a destination station.

The dynamic channel time adjustment capability facilitates the source station to quickly respond to the data needs of the destination stations based on any feedback. This in turn can minimize the buffer requirements on both sides of the channel because it minimizes the impact on the buffer size from periods of non-transmission to any given destination station. Minimizing buffer requirements not only reduces cost, but also means reducing the latency of a data frame traveling through the system in constant rate application scenarios such as AV streaming.

Figure 4:
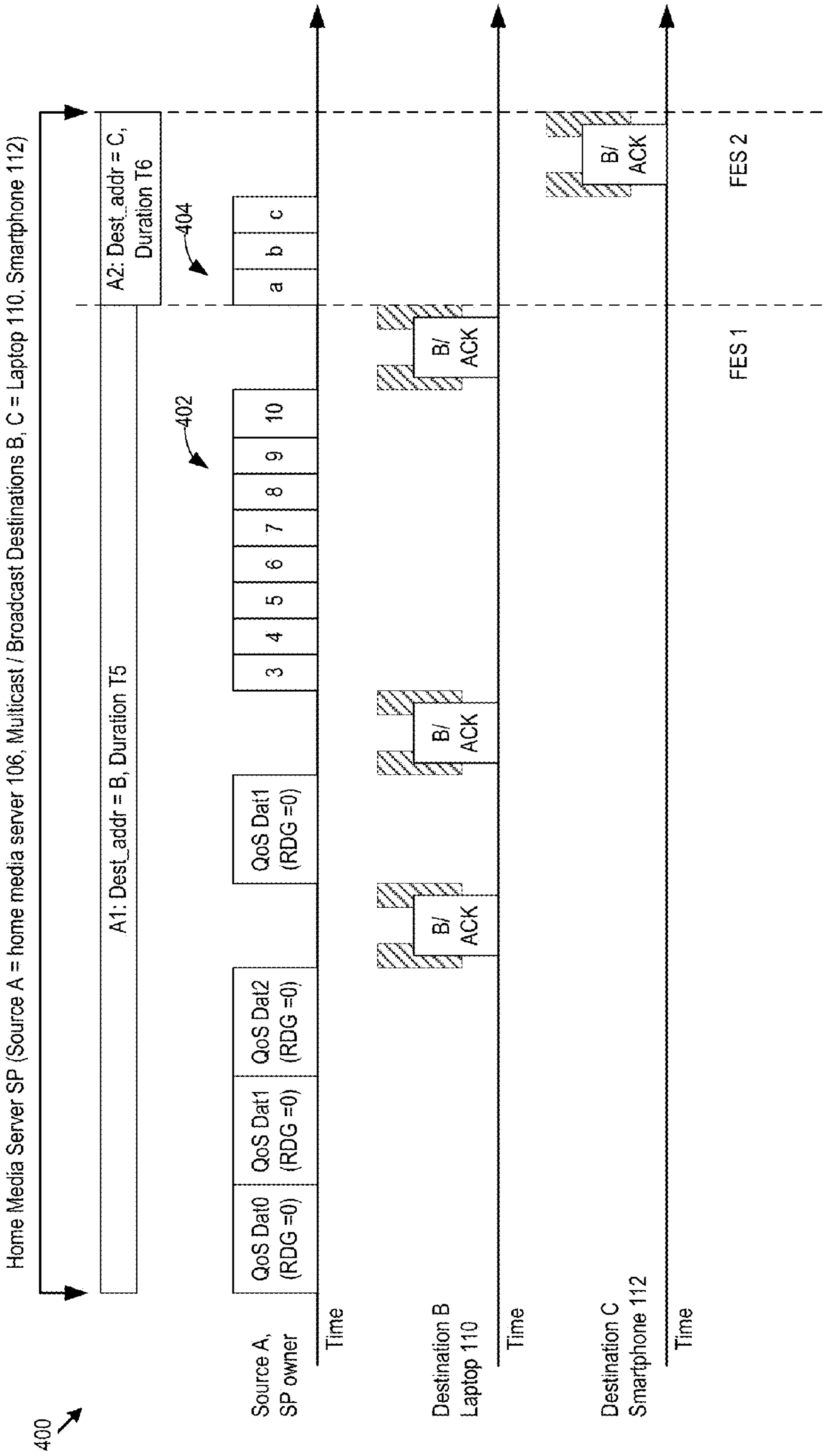
FIG. 4 shows a communication diagram for the source station communicating with multiple destination stations in a subsequent service period, in which the transmit channel allocations have been adjusted dynamically by the SP source station.

FIG. 4 shows a communication diagram 400 for the source station communicating with multiple destination stations in a subsequent service period, in which the transmit channel allocations have been adjusted. As an example, the source station has extended A1 to encompass several additional data frames 402, kept A2 to encompass three data frames 404, and has eliminated A3 and A4. Similarly, the source station may add transmit channel allocations instead of eliminating them.

Figure 5:
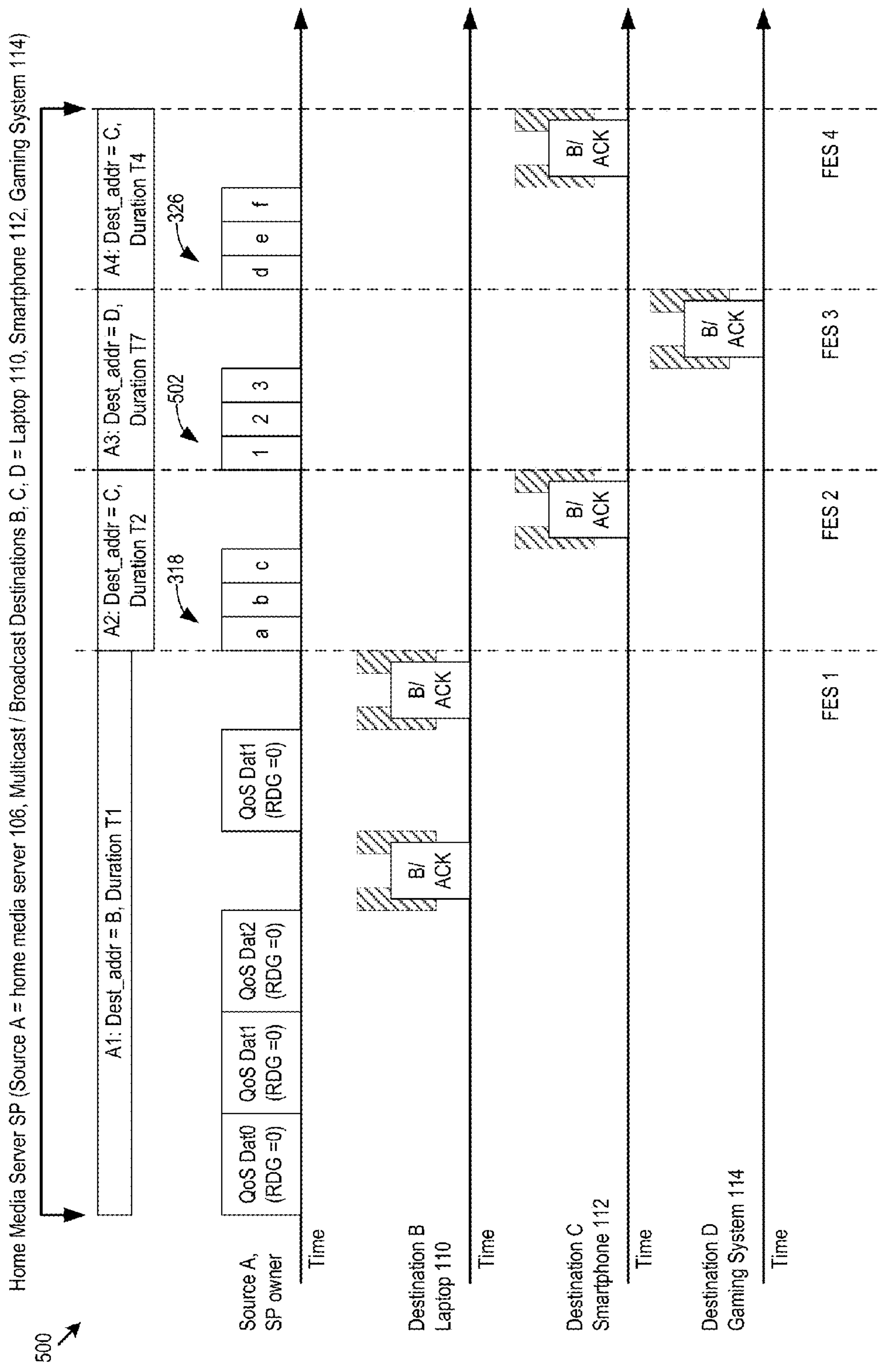
FIG. 5 also shows a communication diagram for the source station communicating with multiple destination stations in a subsequent service period, in which the transmit channel allocations have been adjusted dynamically by the SP source station.

FIG. 5 also shows a communication diagram 500 for the source station communicating with multiple destination stations in a subsequent service period, in which the transmit channel allocations have been adjusted. In this example, the source station has changed the transmit channel allocation A3 to communicate to an additional destination station. Specifically, the source station now uses A3 to communicate the data frames 502 to the portable gaming system 114.

Figure 6:
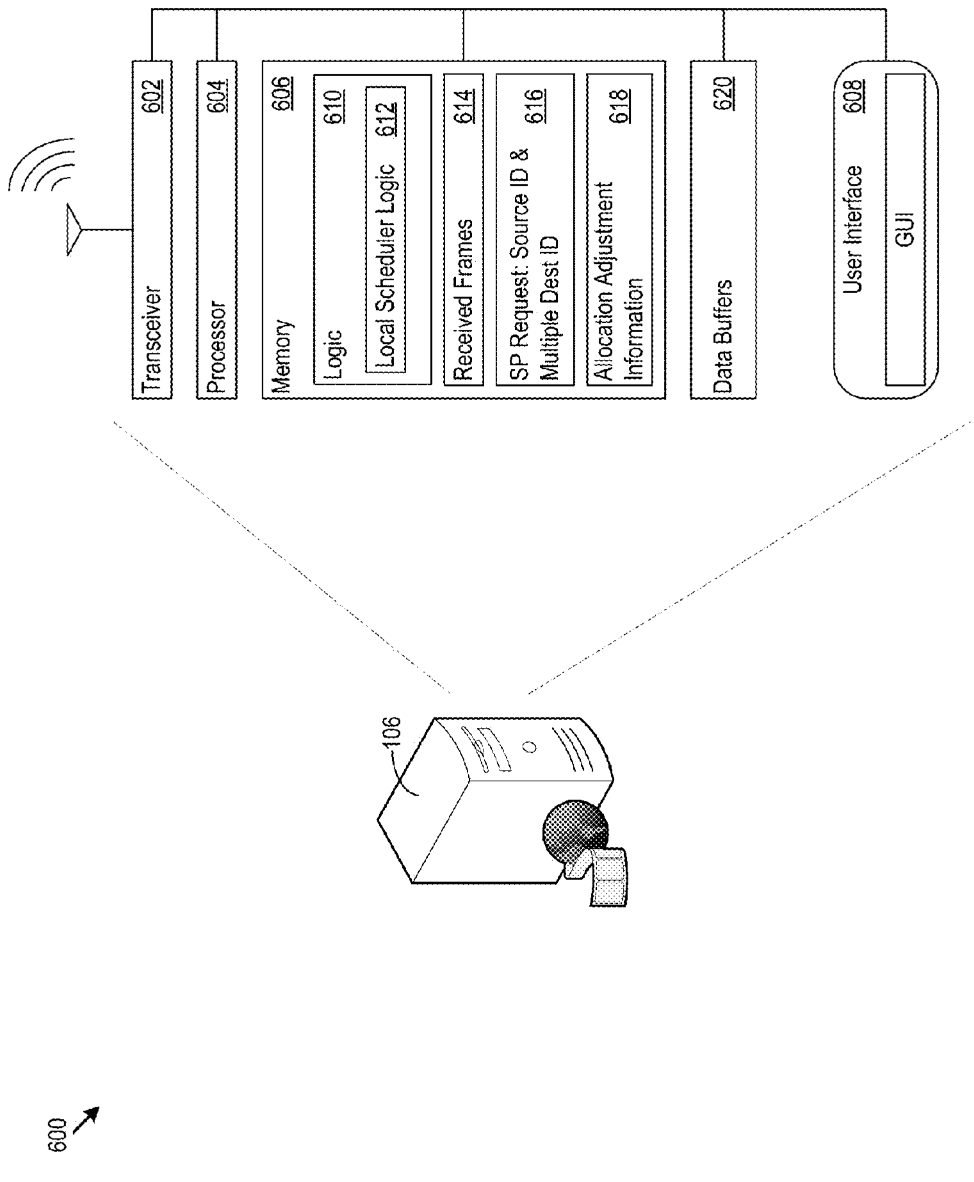
FIG. 6 shows an example of a station.

FIG. 6 shows an example implementation of a station 600, in this instance the home media server 106. The station 600 includes a transceiver 602, one or more processors 604, a memory 606, and a user interface 608. The transceiver 602 may be wireless transceiver, and the transmitted and received signals may adhere to any of a diverse array of formats, protocols, modulations, frequency channels, bit rates, and encodings that presently or in the future may support WiGig service periods or similar types of dedicated channel allocations, such as the GHz WiGig/802.11TGad specifications.

The processor 604 executes the logic 610. The logic 610 may include an operating system, application programs, firmware, or other logic. The logic 610 includes local scheduler logic 612. The local scheduler logic 612 executes within the station 600, as opposed to within the centralized network scheduler 116, which handles scheduling, in general, for the stations in the network as described above. Depending on the implementation, the processor 604 may be one or more processing units (e.g., multiple microcontrollers). The task partitioning among the processing units may be based upon many different factors, including whether real-time response or processing of a particular task is desired. The local scheduler logic 612 may implement the processing noted above, and described below with respect to FIGS. 6 and 7, including negotiating QoS requirements using TSPECs, processing the received channel allocations from the network scheduler, further scheduling transmit channel allocations within an SP (at any desired level of granularity) to any number of destination stations, and dynamically adjusting transmit channel allocations. The fine-grained, localized scheduling and dynamic adjustment within a SP allocation may be handled in real-time. Hence, the local scheduler logic 612 may be executed, for example, by a dedicated processing unit that may assist with lower level hardware medium access control (MAC). Other real-time implementations may be employed, however.

The station 600 may save allocation adjustment information 618 in the memory 606 for consideration by the scheduler logic 612. The allocation adjustment information 618 may include information local to the station 600, such as the buffer level of the data buffers 620 that temporarily queue data for transmission during the SPs, or the expected throughput, data rate, QoS, or other requirements for each destination station. The allocation adjustment information 618 may also include information external to the station 600, such as the buffer level of data buffers in a destination station, signal-to-noise ratio or other channel conditions, or other information.

The scheduler logic 612, based on the allocation adjustment information, may dynamically change transmit channel allocations for the current or subsequent SPs. The dynamic changes may include: increasing the number of destination stations communicated with during an SP, decreasing the number of destination station communicated with during an SP, changing the destination stations communicated with during an SP, increasing (e.g., in time) one or more transmit channel allocations, decreasing (e.g., in time) one or more transmit channel allocations, and changing the amount of data sent during a transmit channel allocation (e.g., by changing the data encoding to be more or less robust). The scheduler logic may make other changes to the transmit channel allocations.

Figure 7:
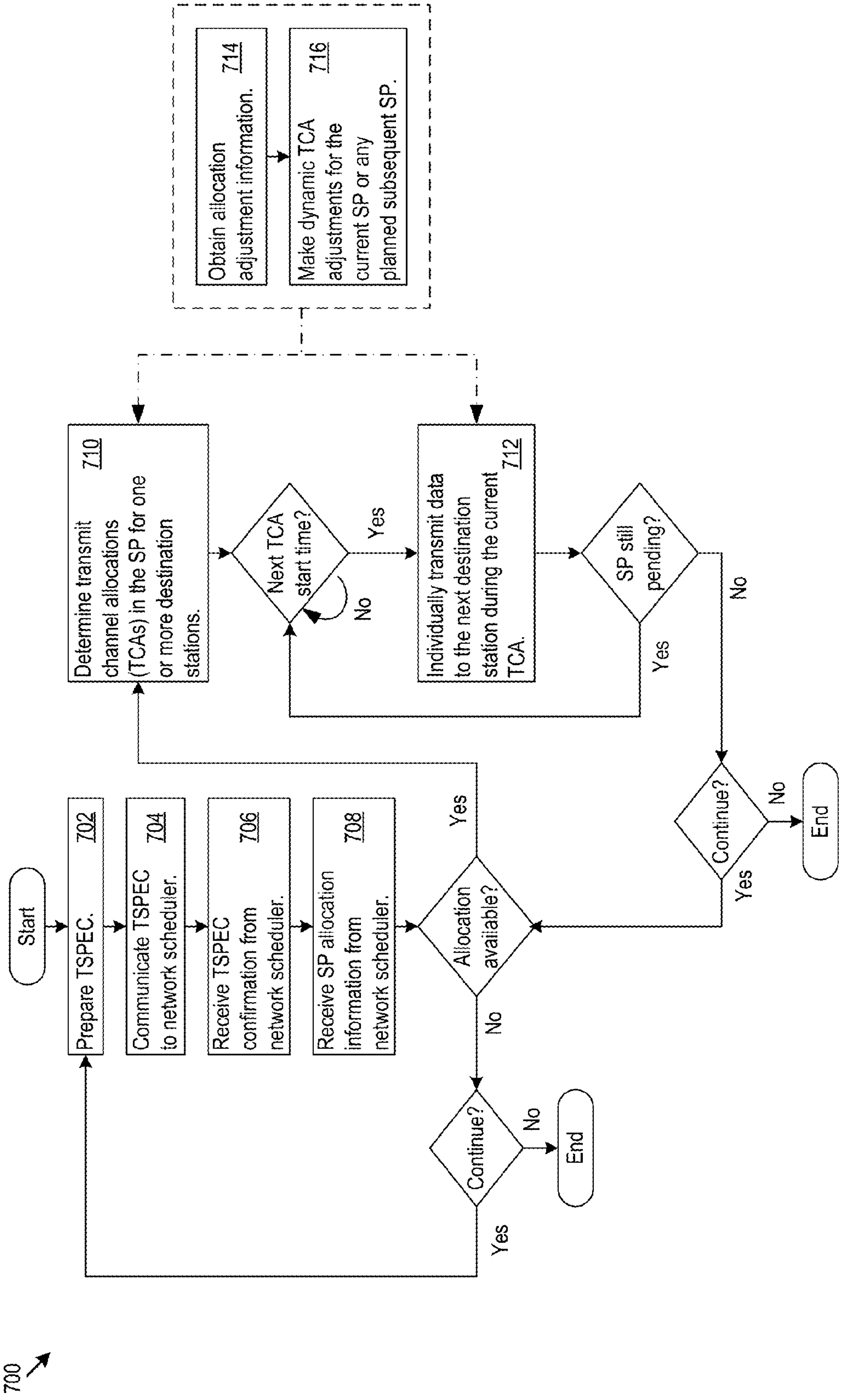
FIG. 7 shows a flow diagram for logic that implements a localized dynamic channel allocation for a source station to communicate with multiple destination stations.

FIG. 7 shows a flow diagram of logic 700 for local dynamic channel allocation. The local scheduler logic 612 may implement the logic 700 as software instructions executed by the processor 604, for example. However, the logic 700 may be implemented in hardware, or as a combination of hardware and software, including as or with dedicated or specialized processors with the processing capability to provide, for example, real-time adaptations to the transmit channel allocations.

A source station prepares the TSPEC to meet its traffic requirements (702) and communicates the TSPEC to the network scheduler 116 (704). The source station may send the TSPEC to the network scheduler 116 in an Add Traffic Stream (ADDTS) Request frame, for example. The network scheduler 116 determines the start time and duration of the SP allocations, and communicates the SP allocation information to all stations associated with the network through beacons and/or Action announcement frames ahead of time. In particular, the network scheduler 116 acknowledges receipt of the TSPEC, and the source station receives the acknowledgement (706). In addition, the source station monitors for SP allocation information sent from the network scheduler 116 to the station (708). The SP allocation information may arrive in an ADDTS Response frame sent by the network scheduler 116 to the source station, and each destination station identified as a destination in the TSPEC in the ADDTS Request frame. In other words, the source station awaits (and the destination stations also receive) the SP information that confirms the SP duration, start time, and other SP information. The SP allocation information may specify a unicast source address, and a multiple recipient destination address, such as a broadcast or multicast address, or other information.

The logic 700 makes a determination of the transmit channel allocations (TCAs) within a SP for any desired destination stations (710). For example, if the station 600 will communicate with three destination stations during the next SP, and the relative throughput needed is 2:3:1, then the logic 700 may determine that there will be three transmit channel allocations (for example) with a ratio in aggregated length of 2:3:1 (e.g., 20 frames:30 frames:10 frames of data). The source station determines when a particular TCA has started, and then individually transmits data to the next destination station during the TCA (712). The SP allocation(s) from the network scheduler 116 may be created by aggregating multiple TSPEC requests involving a common source station and multiple destination stations. In this way, the network scheduler 116 can give the source station the flexibility to decide at what sequence and duration it communicates to each of the destination stations to optimize the latency, data memory size while meeting the QoS requirements for each traffic stream. For example, the station 600 may specifically transmit to a particular destination station by specifying that destination station's identifier in outgoing frames.

The logic 700 may obtain allocation adjustment information (714) before or during the SP or any particular TCA, and may make dynamic transmit allocation adjustments at any time for the current or any subsequent SP or TCA (716). The logic 700 may obtain the allocation adjustment information at discrete points in time, on some predetermined schedule, continuously (e.g., as an always running background process), as information received from other stations or entities in the network, or in other ways. The station 600 may offer reverse direction grants to the destination station, and may use selected data returned by the destination station during the reverse direction grant as allocation adjustment information (e.g., information concerning buffer level at the destination station).

The local dynamic allocation process may continue for each transmit channel allocation for each destination station. The allocation adjustment information may be local to the station 600 (e.g., buffer levels in the station 600), external to the station 600 (e.g., information received that indicates expected relative desired throughput to each of multiple destination stations, or buffer levels at a destination station), or may be any other type of information that the logic 700 can consider to determine transmit channel allocations.

The methods, stations, and logic described above may be implemented in many different ways in many different combinations of hardware, software or both hardware and software. For example, all or parts of the station 600 may include circuitry in one or more controllers, microprocessors, or application specific integrated circuits (ASICs), or may be implemented with discrete logic or components, or a combination of other types of circuitry. All or part of the logic may be implemented as instructions for execution by a processor, controller, or other processing device and may be stored in a machine-readable or computer-readable medium such as flash memory, random access memory (RAM) or read only memory (ROM), flash memory, erasable programmable read only memory (EPROM) or other machine-readable medium such as a compact disc read only memory (CDROM), or magnetic or optical disk.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method, comprising:

choosing a first destination station;

obtaining, at a first source station, a first transmit channel allocation from network scheduler circuitry for individual transmission to the first destination station within a service period, the first transmit channel allocation being shorter than the service period; and during the first transmit channel allocation within the service period, individually transmitting from the first source station to the first destination station.

2. The method of claim 1, further comprising receiving, from the network scheduler circuitry, a second transmit channel allocation for the service period, the second transmit channel allocation for individual transmission to a second destination station.

3. The method of claim 2, further comprising:

obtaining allocation adjustment information external to the source station for dynamically adjusting the first transmit channel allocation, the second transmit channel allocation, or both.

4. The method of claim 2, wherein receiving the second transmit channel allocation comprises receiving the second transmit channel allocation at second source station.

5. The method of claim 1, wherein the first transmit channel allocation comprises a time duration allocation.

6. The method of claim 1, further comprising:

adjusting the first transmit channel allocation for use in a subsequent service period.

7. The method of claim 6, wherein adjusting the first transmit channel allocation comprises obtaining allocation adjustment information local to the source station.

8. The method of claim 1, wherein the first destination station is specified by a multicast address or a broadcast address transmitted from the first source station.

9. A system, comprising:

a transmitter; and network scheduler circuitry in communication with the transmitter, the network scheduler circuitry configured to:

receive a request, from a first source station, to individually transmit during a service period to a first destination station from among multiple destination stations;

determine a first transmit channel allocation within the service period, the first transmit period being shorter in extent than the service period; and transmit, with the transmitter, allocation information for the first transmit channel allocation within the service period to the first source station.

10. The system of claim 9, wherein the network scheduler circuitry is further configured to receive a request, from a second source station, to individually transmit during the service period.

11. The system of claim 10, wherein the network scheduler circuitry is further configured to schedule a second transmit channel allocation within the service period for the second source station.

12. The system of claim 11, wherein the network scheduler circuitry is further configured to transmit, with the transmitter, allocation information for the second transmit channel allocation to the second source station.

13. A device, comprising:

source circuitry configured to:

select a first destination station from among multiple destination stations; and generate a request to individually transmit to the destination station during a service period; and a transceiver configured to:

receive, from network scheduler circuitry, allocation information identifying a first transmit channel allocation for the service period, a duration of the first transmit channel allocation being shorter than a duration of the service period; and responsive to the allocation information, individually transmit to the first destination during the first transmit channel allocation.

14. The device of claim 13, wherein the transceiver is further configured to receive a modification to the first transmit channel allocation for a subsequent service period.

15. The device of claim 14, wherein the modification comprises a time duration change.

16. The device of claim 15, wherein the first transmit allocation is one of multiple transmit allocations within the service period.

17. The device of claim 14, wherein the modification comprises a data rate change.

18. The device of claim 14, wherein the modification comprises an a revocation of the first transmit channel allocation.

19. The device of claim 14, wherein the source circuitry is further configured to generate a request for the modification.

20. The device of claim 13, wherein the transceiver is configured to send a message comprising a multicast identifier associated with the first destination station.

* * * * *